3,849,549
INDOMETHACIN SUPPOSITORIES
Robert E. Dempski, Dresher, and Joseph C. Saboe, Norristown, Pa., assignors to Merck & Co., Inc., Rahway, N.J.
No Drawing. Continuation-in-part of abandoned application Ser. No. 187,113, Oct. 6, 1971. This application June 9, 1972, Ser. No. 261,178
Int. Cl. A61j 3/08; A61k 27/00
U.S. Cl. 424—78    5 Claims

ABSTRACT OF THE DISCLOSURE

Suppositories which contain indomethacin, glycerin and a nucleating agent in a polyethylene glycol base.

CROSS-REFERENCE TO RELATED APPLICATIONS

This application is a continuation-in part of U.S. application Ser. No. 187,113, filed Oct. 6, 1971, now abandoned.

This invention relates to the preparation of novel indomethacin suppositories which contain glycerin and a nucleating agent in a polyethylene glycol base. The invention further relates to the method of using said novel suppositories. More specifically, the invention relates to the preparation of 40 mg.–110 mg. indomethacin suppositories which contain glycerin and a nucleating agent in a polyethylene glycol base. The polyethylene glycol bases included herein are highly desirable due to their solubility in water and in the secretions of mucous membranes.

The literature teaches the preparation of indomethacin suppositories in a polyethylene glycol base which includes 4–12% by weight of glycerol (see U.S. Pat. No. 3,644,630).

It is an object of this invention to prepare a suppository which contains indomethacin in a base consisting substantially of polyethylene glycols.

Another object of this invention is the preparation of a suppository which contains indomethacin in an enhanced physically and chemically stable condition.

A further object of this invention is to provide indomethacin in an opaque and aesthetically appearing suppository form.

Still another object of this invention is the preparation of a suppository containing indomethacin in a crystalline form.

It has been known that in the preparation of suppositories, discoloration, esterification and other undesirable conditions may result which effect the chemical and physical stability of the suppositories.

In a continuous search for a process for preparing indomethacin suppositories, which possess both chemical and physical stability, we have found that by the addition of from about 4 to not more than about 12% by weight of the suppository of glycerol U.S.P. and from about 1.0 to not more than about 4.5% by weight of the suppository of a nucleating agent to a molten polyethylene glycol base containing dissolved indomethacin, an unexpected enhanced stable condition results.

To practice this invention, a molten solution of indomethacin and polyethylene glycol is prepared, to which are added from about 1.0 to not more than about 4.5% by weight of the suppository of a nucleating agent and from about 4 to not more than about 12% by weight of the suppository of glycerol. This product may be prepared at those temperatures which will provide a molten state. The mass is then sub-divided into suppository doses and allowed to congeal by lowering the temperature of the system. It is preferred to congeal at room temperature.

The indomethacin contained in the suppository crystallized in the matrix within a short period of time after congealing commences. If the nucleating agent is not present, then excessive time is required for crystallization to occur. This condition can result in the preparation of suppositories which possess undesirables conditions such as esterification and discoloration.

The polyethylene glycol base may be made from any suitable pharmaceutical grade polyethylene glycol or mixtures thereof of various molecular weights which are used to prepare suppositories that are soluble in water and in the secretions of mucous membranes. Representative polyethylene glycol bases are polyethylene glycol 1000, 1540, 4000 and 6000. The selection of the exact composition of the base will, of course, depend on the properties desired in the suppository, such as solubility, congealing temperature, size, etc. The more preferred bases are those prepared from polyethylene glycol 4000 and polyethylene glycol 6000. The amount of the base employed in this invention is not critical and will depend on the overall size of the suppository, the desired use, and the dosage of indomethacin in each suppository. For example, the amount of base can vary from about 50% to 95% by weight of the suppository.

Representative nucleating agents which can be employed in the practice of the invention are alkali halides such as sodium chloride, potassium chloride, and the like; calcium chloride, lactose and sucrose. Of particular preference is sodium chloride. The congealing temperature will, of course, depend on the composition of the base.

Indomethacin is a drug which has anti-inflammatory, analgesic and anti-pyretic properties. The chemical name is 1 - (p - chlorobenzoyl) - 5 - methoxy - 2 - methyl-indole-3-acetic acid. See United States Pat. No. 3,161,654.

With respect to the dose level, it should be noted, that the specific dose level for any particular patient will depend upon a variety of factors including the age, body weight, general health, sex, time of administration, rate of excretion, and the severity of the disease undergoing therapy.

The following examples are given to illustrate the invention and are not intended to be a limitation thereof.

| Ingredients | Percent by weight | | | |
|---|---|---|---|---|
| Polyethylene glycol 4000 | 88.6 | 84.6 | 81.00 | 77.6 |
| Polyethylene glycol 6000 | | | | 7.8 |
| Sodium chloride | 3.5 | 3.45 | 3.45 | 3.4 |
| Glycerol U.S.P | 4.4 | 8.5 | 12.1 | 7.8 |
| Indomethacin | 3.5 | 3.45 | 3.45 | 3.4 |

The polyethylene glycols are heated to 65° C. and upon melting, indomethacin is added and dissolved. Sodium chloride is then suspended in the molten mass with stirring. The temperature of the mass is reduced to 55–60° C. and maintained for 10–15 minutes while glycerol is added. The mass is then sub-divided into suppositories containing the desired amount of drug and congealed at room temperature. Further storage at 5° C. and ambient temperatures yields an elegant white opaque suppository.

What is claimed is:

1. A suppository preparation consisting essentially of a dosage unit amount of indomethacin in a polyethylene glycol or a mixture of polyethylene glycols base containing from about 1.0 to not more than about 4.5% by weight of a nucleating agent selected from the group consisting of alkali halide, lactose, calcium chloride and sucrose, and from about 4 to not more than about 12% by weight of glycerol.

2. A suppository preparation according to claim 1, wherein the dosage unit amount of indomethacin ranges from about 40–110 mg.

3. A suppository preparation according to claim 2, wherein the dosage unit amount of indomethacin is 50 mg.

4. A suppository preparation according to claim 3, wherein the polyethylene glycol is selected from the group consisting of polyethylene glycol 4000 and polyethylene glycol 6000 and mixtures thereof.

5. A suppository preparation according to claim 4, wherein the polyethylene glycol base is a mixture of polyethylene glycol 4000 and polyethylene glycol 6000, and the nucleating agent is sodium chloride.

References Cited
OTHER REFERENCES

| | | | |
|---|---|---|---|
| 3,644,630 | 2/1972 | Allen et al. | 424—274 |
| 2,538,127 | 1/1951 | Saunders et al. | 424—78 X |
| 2,975,099 | 3/1961 | Goyan et al. | 424—78 X |
| 3,234,091 | 2/1966 | Lang et al. | 424—78 X |
| 2,149,005 | 2/1939 | Bockmuhl et al. | 424—78 X |
| 3,432,592 | 3/1969 | Speiser | 424—78 X |
| 3,308,217 | 3/1967 | Lowy et al. | 264—117 |

SHEP K. ROSE, Primary Examiner

U.S. Cl. X.R.

424—274, 358